Nov. 21, 1950  J. W. HIBBERT ET AL  2,531,044
ELECTRIC MOTOR
Filed Jan. 21, 1947  2 Sheets-Sheet 2
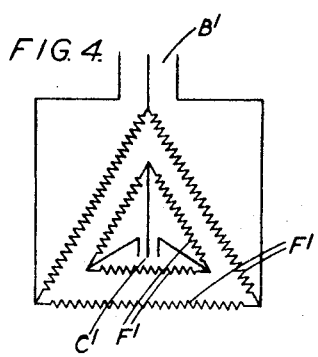
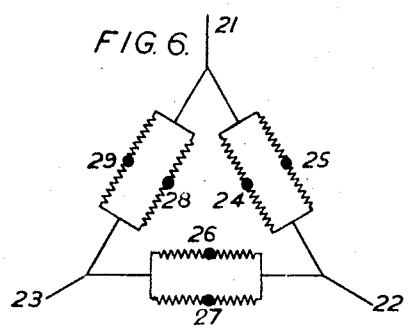
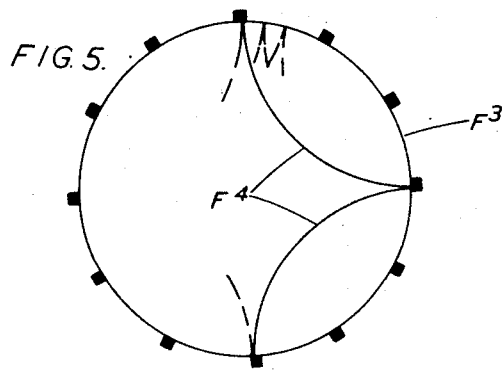
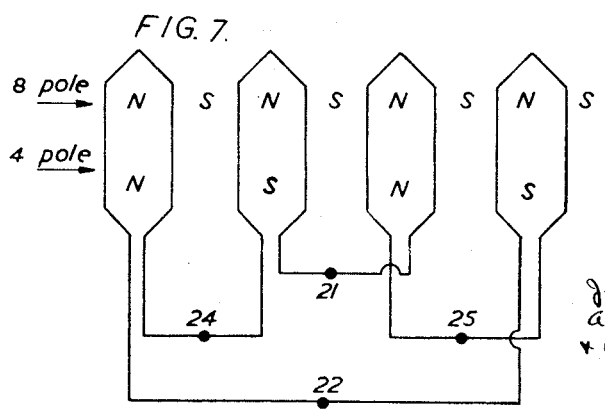
J. W. Hibbert,
A. J. Robertson
& C. Beveridge
Inventors
By Watson, Cole,
Grindle & Watson
Attorney Patented Nov. 21, 1950

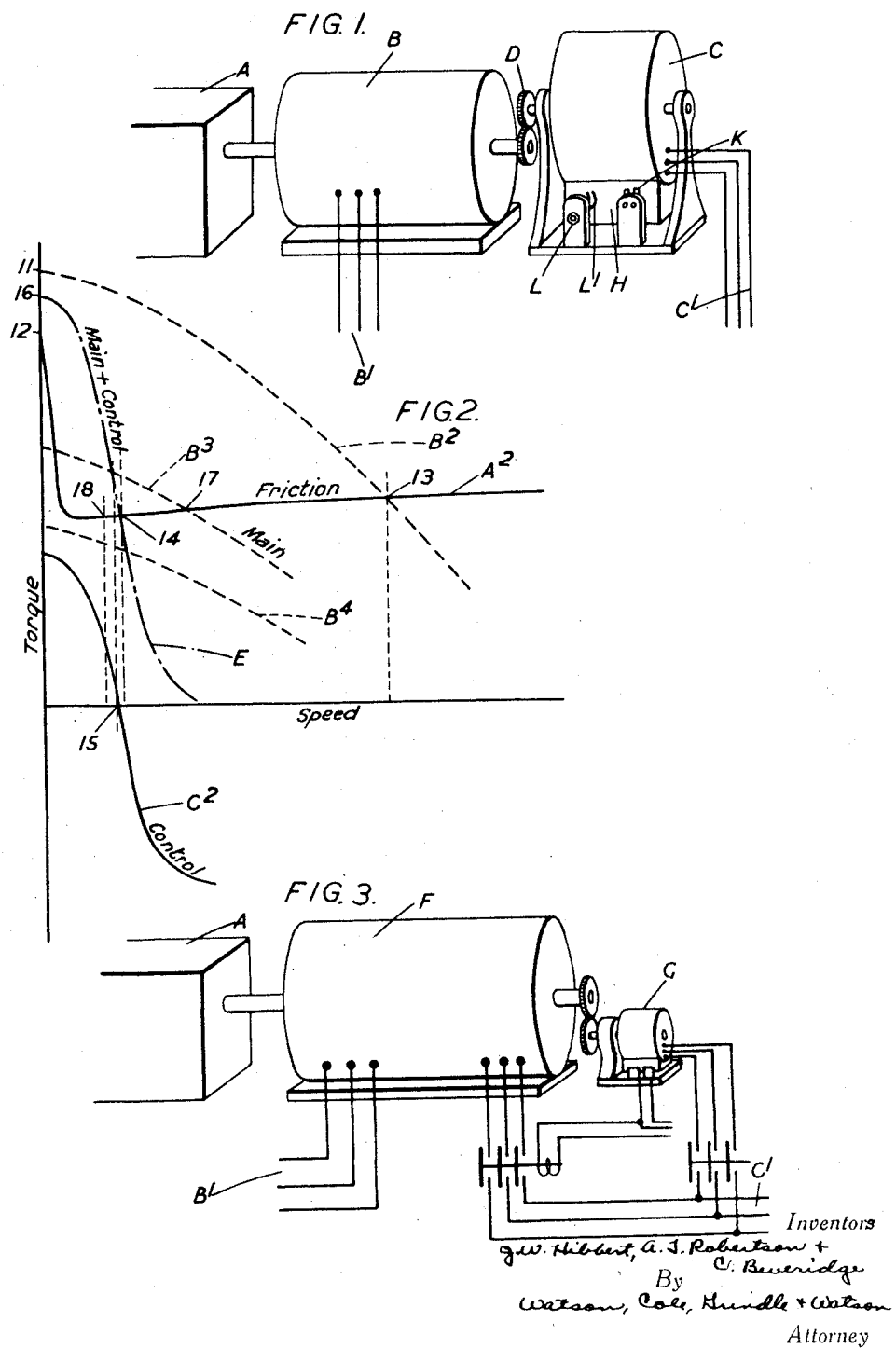

2,531,044

UNITED STATES PATENT OFFICE 2,531,044

ELECTRIC MOTOR

John Warren Hibbert, Gateshead, and Alexander Thornton Robertson and Clifford Beveridge, Newcastle-on-Tyne, England, assignors to A. Reyrolle & Company Limited, Hebburn-on-Tyne, England, a company of Great Britain Application January 21, 1947, Serial No. 723,418 In Great Britain January 23, 1946

4 Claims. (Cl. 318—46)

This invention relates to electric motors and is particularly concerned with electric driving means for operation at a normal speed, or range of normal speeds as well as at a much lower creeping speed. Such apparatus may be required for example for driving printing presses, calenders and the like which have to be operated from time to time at speeds of the order of 2 or 3 per cent of their maximum speed, for such purposes as feeding in the material, adjusting the rolls and so forth.

In general the torque required to start such a machine from rest is greater than that required to keep it running at the creeping speed, and in addition the required torque may vary appreciably throughout each revolution. The normal driving means, designed primarily for operation at the normal speed, will produce a torque which over the small range of speed from standstill to the creeping speed is approximately constant or falls by only a small percentage. Consequently if the driving means is adjusted to give sufficient torque to start the machine from rest there will be an excess torque at the desired creeping speed which will accelerate the machine to a higher speed, that is to a speed greater than the desired creeping speed, and a stable creeping speed of the desired value may not be obtainable.

Various arrangements have been proposed for providing a stable creeping speed. In some the driving motor is so constructed, or two interconnected motors are so arranged, that either direct current or low-frequency single-phase current can be supplied to the windings to produce a braking (or generator) torque rising rapidly with speed, at the same time that the normal power supply is producing a motoring torque in the same windings. In either case the torque produced at standstill by the direct or low-frequency current is zero. An object of the present invention is to provide an arrangement in which an additional useful torque is provided at standstill to assist break-away as well as a braking torque to control the creeping speed.

Thus according to the present invention the normal driving assembly is supplemented by a control assembly comprising an induction machine supplied with polyphase low-frequency current so as to produce a motoring torque at standstill falling rapidly with increase of speed to zero in the neighbourhood of the synchronous speed corresponding to the said low-frequency, and a rapidly rising braking (or generator) torque with further increase of speed.

The driving assembly and the control assembly may comprise entirely separate machines, or they may comprise a single carcass having separate core and windings, or they may share a common core with separate windings, or even they may share the same windings suitably connected. The choice of arrangement will depend on convenience and on the type and construction of motor used for the driving assembly.

By means of the invention the power required from the driving assembly (i. e. the main driving motor where separate machines are used) to break away, is reduced by the amount contributed by the control assembly, and the power of the latter when acting as a brake need only be sufficient to restrain this reduced amount of motoring power; that is, the power of the control assembly is only about half what it would have to be if it did not also help the break-away. Reducing the duty of the control assembly reduces the low-frequency power and so reduces the size of the equipment required for conversion. Further, due to the smaller torque required from the main driving assembly to break away there is a smaller and less rapid speed increase, when the braking effect of the control assembly is removed, than there would be with a main assembly of the same characteristic if the latter were not helped to break away.

In addition to the means for supplying the control assembly with low-frequency polyphase current for starting and creeping, means may also be provided for supplying it with direct current for decelerating braking, so as to generate a braking torque at all speeds down to standstill instead of only at speeds above the low-frequency synchronous speed.

The present applicants have previously proposed to operate a commutator motor as an induction motor from a low-frequency supply to obtain a stable creeping speed. Here again the low-frequency power required is greater than with the present invention since it must suffice to break the press away from standstill unaided by the normal power supply. Moreover when accelerating from creep speed to normal speed it is necessary to switch off the low-frequency supply before switching on the normal supply and running the motor as a commutator motor. This break in the power supply causes an undesirable check in the speed.

According to a further feature of the invention, not necessarily associated with those described above, a speed responsive device for responding to changes of speed at an operating speed, which is a small fraction of the maximum speed of a rotating part, includes an electric induction machine for connection to the rotating part, means for feeding the machine with alternating current of such frequency that it develops zero torque in the neighbourhood of the said operating speed, and means responsive to the torque exerted by the said machine. Preferably such a speed responsive device is provided with switch contacts operated in accordance with the torque exerted by the machine so as to constitute a speed responsive switch.

The invention may be carried into effect in various ways but certain specific embodiments will be described by way of example with reference to the accompanying diagrammatic drawing in which Figure 1 is a diagram of an arrangement in which the main driving assembly and the control assembly are incorporated in separate machines.

Figure 2 shows a number of hypothetical speed torque characteristics illustrating the operation of the arrangement.

Figure 3 is a diagram of an arrangement in which the main driving assembly and the control assembly are incorporated in a single machine.

Figure 4 is a diagram of the stator windings of an arrangement employing a common core for the main driving assembly and the control assembly.

Figure 5 is a diagram indicating the cross connections of the commutator for the stator arrangement of Figure 4.

Figure 6 is a diagram of the connections of the stator windings for an arrangement employing common windings for the main driving assembly and the control assembly, and Figure 7 is a diagram indicating how the windings of Figure 6 are arranged to produce the desired polarity.

The arrangement indicated diagrammatically in Figure 1 comprises a machine A to be driven at a range of normal speeds as well as at a much lower creeping speed. The driven machine is directly coupled to a main driving motor B for driving it at normal speeds. This main driving motor may be any preferred type of prime mover for operation by any source of power, but conveniently it comprises an electric motor preferably of polyphase commutator type. It is then supplied from supply mains of normal frequency indicated at $B^1$.

To enable a stable creeping speed to be obtained, a control machine C is provided which as indicated is connected to be energised from polyphase mains $C^1$ of considerably lower frequency than the normal frequency mains $B^1$. This machine is of induction type and to allow greater flexibility in its design it may be connected to the main driving motor through gearing shown at D. The design of the motor C, the ratio of the gearing, and the frequency of the supply $C^1$, are so coordinated that the synchronous speed of this motor will be slightly below the desired creeping speed, and the speed torque characteristic of the main driving motor at this speed will be slightly above the frictional resistance of the driven machine.

The function of the auxiliary control machine can be explained with reference to the hypothetical speed-torque characteristics shown in Figure 2. There the curve $A^2$ represents the frictional torque characteristic of the driven machine, which it will be seen requires a much higher torque to start it in motion or cause break-away, than is required to keep it going at low speeds, or even at normal speeds. The characteristic of the main motor would be somewhat of the shape shown at $B^2$ which indicates the particular adjustment that would be required to cause break-away, i. e. to ensure that the motor torque represented by the point 11 would be above the frictional resistance represented by the point 12. Consequently if the machine were adjusted in this manner to start, it would at once accelerate to the speed indicated by the point 13, whereas the desired creeping speed might be as indicated at the point 14. If a lower torque curve were obtained by adjustment, for example that shown at $B^3$, the torque at standstill would not be sufficient to cause break away.

The torque characteristic of the auxiliary control machine alone is indicated at $C^2$ from which it will be seen that from a substantial value at standstill it falls rapidly with increase of speed to zero in the region of its synchronous speed indicated at 15, after which it changes sign and rapidly builds up a substantial negative or braking torque. The resultant torque obtained by adding the values of the curve $C^2$ to those of the curve $B^3$, is indicated by the curve E which therefore shows the resultant torque of the two motors together. It will be seen that at standstill this gives a torque, indicated at 16, sufficient to cause break-away, but that the torque drops sufficiently with increase of speed to ensure a stable creeping speed at the point 14. This is slightly above the synchronous speed corresponding to the low-frequency of the supply to the motor C, and hence at the creeping speed this motor is exerting a braking or negative torque. As a result when it is disconnected the machines will slightly speed up rather than slowing down with a danger of encountering increased resistance and stopping altogether.

For further increase of speed to the normal range the main motor is adjusted to give characteristics such as that shown at $B^2$.

The main driving assembly and the control assembly are shown in Figure 1 as separate machines, but if desired they may be combined to a greater or less extent. For example they may comprise separate cores and windings but may share a common shaft and bearings in a common carcase.

Alternatively as indicated diagrammatically in Figures 3 to 5 the main driving assembly and the control assembly may be incorporated in a single machine F in which they share a common core but are provided with separate windings.

The auxiliary machine G shown in Figure 3 is simply a speed responsive switch and is described later.

In one such embodiment as indicated in Figure 4, the normal frequency winding $F^1$ of the main driving assembly is wound to produce eight poles, while the low frequency winding $F^2$ of the control assembly is wound to produce four poles. These two windings are such that there is no substantial mutual inductance between them. The 8-pole winding $F^1$ cooperates with the commutator winding on the rotor which is wound for 8 poles. The commutator $F^3$ is provided with (or this winding includes) cross connections or equaliser leads $F^4$ which, as indicated in Figure 5, connect together points on it which are 90° apart. Accordingly these points are 360 electrical degrees apart on the basis of the 8 pole field and no current flows through them as a result of this field, but on the basis of the 4 pole field they are 180 electrical degrees apart and constitute short circuiting connections so as to cause the rotor to co-operate with the low frequency control winding as an induction machine.

If desired the main driving assembly and the control assembly may share common windings as well as a common core. In one such embodiment as indicated in Figures 6 and 7 the winding of each phase is arranged in the form of a bridge. Of each bridge two opposite corners are connected to one phase of one supply 21, 22, 23, while the other two corners are connected to one phase of the other supply 24, 25, 26, 27, 28, 29. One supply or the other will need to be provided with separate windings for each phase but it is immaterial which. In each case a star or delta connection may be employed. Provided these bridges are suitably balanced the terminals of each supply are at equipotential points with respect to the other supply.

The combined stator windings indicated in Figure 6 co-operate with the core projections in the manner indicated in Figure 7, which shows the arrangement for a single phase. Here it will be seen that each arm of the bridge, taken serially round the bridge, represents a winding round consecutive alternate core projections (or groups of such projections). A phase of the one supply, say the normal-frequency supply, is connected to the points 21, 22 as shown and from it the currents in the two parallel paths produce the same polarity in all the core projections concerned, (i. e. alternate projections) and therefore opposite polarity in all the intervening projections. On the other hand the other supply, say the low frequency supply, is connected to the points 24, 25, and from it the currents in the two parallel paths produce opposite polarity in consecutive core projections. Hence the field produced by the latter supply has half as many poles as that produced by the former supply.

The effect of the combined windings of Figures 6 and 7 is therefore equivalent to that of Figures 3 to 5 and the same arrangement of the rotor can be employed to function in a similar manner.

A further feature of the invention relates to a speed responsive switch which though not confined to use with the system so far described is none the less particularly suitable for such use.

In the arrangement described, referring again to Figure 2, it has already been noted that if the main driving assembly is adjusted to a speed torque curve such as $B^3$ then as soon as the control assembly is switched off the speed will increase to that indicated by the point 17. If on the other hand the main driving assembly were adjusted to give a curve such as that shown at $B^4$ the torque exerted by the main driving assembly would not alone be sufficient to overcome the resistance, the difference would be made up by the control assembly, and the creeping speed would be slightly below the synchronous speed of the latter, for example as indicated at the point 18. In these circumstances there might be no difficulty in starting and obtaining a stable creeping speed, but immediately the control assembly was switched off the torque of the main driving assembly would be insufficient to overcome the resistance and the machines would slow down and stop. Any danger of this occurring can be prevented by the provision of a switch serving to prevent the control assembly from being switched off without the main driving assembly except when the control assembly is exerting a braking torque.

This may be done in two ways. On the one hand where the control assembly is embodied in a separate machine a switch may be employed which responds to the torque delivered by this machine. On the other hand it is possible to employ a small auxiliary machine in which the conditions correspond to those of the control assembly so that it exerts a braking torque when the control assembly exerts a braking torque, and a driving torque when the control assembly exerts a driving torque, and rely upon the torque exerted by the auxiliary machine to operate the switch contacts.

An example of the former arrangement is shown in Figure 1. Here the stator of the machine C, constituting the control assembly, is mounted so that it can swing about its axis. It is provided with a projection H serving to operate contacts K. The projection H may travel between adjustable stops L which relieve the contacts of the main driving torque, and in addition may be provided with springs $L^1$ on one or each side of it so that the contacts are only operated when a predetermined torque, either driving or braking, is exerted. Any form and arrangement of contacts may be employed whether of mercury or solid type, and whether normally closed and opened by the torque exerted, or normally opened and closed by the torque exerted.

In Figure 3, the machine G indicates an auxiliary machine for operating the switch contacts. In this case as already described both the control assembly and the main driving assembly are incorporated in the single machine F and the machine G only performs the function of operating the switch contacts. In this case it may be arranged in a manner similar to that described for the machine C in Figure 1, but as it is only required to produce sufficient torque to operate the contacts it can be of very much smaller size. Even so such torque as it does produce will assist the control assembly to perform its function whether of exerting a driving torque or of exerting a braking torque.

Instead of arranging the stator to swing and operate the contacts, either in the arrangement of Figure 1 or that of Figure 3, the machine may be driven through gearing having co-axial driving and driven members and arranged so that it can rock about the axis of these members in response to the reaction torque developed in it. Such rocking movement may be relied upon to operate contacts in accordance with the torque transmitted by it. In many cases it would in any event be convenient to provide some such gearing in order to facilitate obtaining the desired creeping speed with a convenient number of poles and the low frequency available.

In the case of the arrangement shown in Figure 3 it is preferred that the auxiliary machine should operate from the same low frequency supply as the control assembly. This, however, is not essential since the gearing and number of poles of the auxiliary machine may be such that it will perform its function when fed from a supply of higher frequency. One advantage of employing an auxiliary machine as indicated in Figure 3 is that it can remain connected to its supply when the control assembly is switched off for running at normal speed. The auxiliary machine is then already connected so as to perform its function as soon as the speed drops again.

What we claim as our invention and desire to secure by Letters Patent is:

1. Electric driving means for operation at normal speeds as well as at a much lower creeping speed, including a driven element, a main driving assembly comprising a polyphase variable-speed electric commutator motor operatively connected to drive said driven element, a control assembly for use at creeping speeds including an electric induction machine operatively connected to drive said driven element, means to supply current to the main assembly at a normal frequency when operating at normal speeds, and, when starting and operating at creeping speeds, means to supply current at a normal frequency to the main assembly and simultaneously to supply to the control assembly current at a frequency much lower than the said normal frequency, so that the control assembly will produce a motoring torque at standstill, falling rapidly with increase of speed to zero in the neighbourhood of the synchronous speed corresponding to the said low frequency, and a rapidly rising braking torque with further increase of speed.

2. Electric driving means for operation at normal speeds as well as at a much lower creeping speed, including a driven element, a main driving assembly comprising a polyphase electric motor operatively connected to drive said driven element, a control assembly for use at creeping speeds including an electric induction machine separate from the main driving assembly and operatively connected to drive said driven element, means to supply current to the main assembly at a normal frequency when operating at normal speeds, and, when starting and operating at creeping speeds, means to supply current at a normal frequency to the main assembly and simultaneously to supply to the control assembly current at a frequency much lower than the said normal frequency, so that the control assembly will produce a motoring torque at standstill, falling rapidly with increase of speed to zero in the neighborhood of the synchronous speed corresponding to the said low frequency, and a rapid rising braking torque with further increase of speed, and switch contacts controlling said current supply means for said control assembly and operated in response to variation in the torque exerted by the control assembly and serving to prevent the control assembly from being switched off to allow increase of speed except when the control assembly is exerting a braking torque.

3. Electric driving means for operation at normal speeds as well as at a much lower creeping speed, including a driven element, a main driving assembly comprising a polyphase electric motor operatively connected to drive said driven element, a control assembly for use at creeping speeds including an electric induction machine operatively connected to drive said driven element, means to supply current to the main assembly at a normal frequency when operating at normal speeds, and, when starting and operating at creeping speeds, means to supply current at a normal frequency to the main assembly and simultaneously to supply to the control assembly current at a frequency much lower than the said normal frequency, so that the control assemby will produce a motoring torque at standstill, falling rapidly with increase of speed to zero in the neighbourhood of the synchronous speed corresponding to the said low frequency, and a rapidly rising braking torque with further increase of speed, and a separate auxiliary induction machine mechanically coupled to the main and control assemblies and fed with low frequency current corresponding to that of the control assembly, so as to exert a motoring torque when the control assembly exerts a motoring torque, and a braking torque when the control assembly exerts a braking torque, and switch contacts operated in response to variation in torque exerted by the auxiliary machine, said switch contacts controlling said current supply means for said control assembly.

4. Apparatus as claimed in claim 3 in which the auxiliary machine remains energised at normal speeds when the control assembly is switched off.

JOHN WARREN HIBBERT.
ALEXANDER THORNTON ROBERTSON.
CLIFFORD BEVERIDGE.

REFERENCES CITED

The following references are of record in the file of this patent:

UNITED STATES PATENTS

| Number | Name | Date |
|---|---|---|
| Re. 13,354 | Hunt | Jan. 9, 1912 |
| 660,909 | Lamme | Oct. 30, 1900 |
| 1,518,592 | McLain | Dec. 9, 1924 |
| 2,312,592 | Seeger et al. | Mar. 2, 1943 |
| 2,387,533 | Schmucker | Oct. 23, 1945 |